UNITED STATES PATENT OFFICE.

HEINRICH HÖRLEIN, OF VOHWINKEL, NEAR ELBERFELD, AND WALTER KROPP, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PHENYLALLYLBARBITURIC ACID.

1,056,793. Specification of Letters Patent. Patented Mar. 25, 1913.

No Drawing. Application filed July 16, 1912. Serial No. 709,691.

*To all whom it may concern:*

Be it known that we, HEINRICH HÖRLEIN and WALTER KROPP, doctors of philosophy, chemists, citizens of the German Empire, residing, respectively, at Vohwinkel, near Elberfeld, and Elberfeld, Germany, have invented new and useful Improvements in Phenylallylbarbituric Acid, of which the following is a specification.

The present invention relates to the manufacture and production of the hitherto unknown phenylallylbarbituric acid having the formula:

which has proved to be a valuable hypnotic; an average dose being from ¼ to ½ gram. The process for its production consists in condensing phenylallylmalonic acid ester with urea in the presence of sodium alcoholate

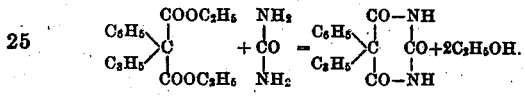

In order to illustrate the new process more fully the following example is given, the parts being by weight:—276 parts of phenylallylmalonic acid ester (=1 mol.) are added to a solution of 35 parts of sodium (=1½ mol.) in 1200 parts of absolute alcohol. 90 parts of urea (=1.5 mol.) are added thereto and the mixture is heated to boiling in a vessel provided with a reflux condenser during 6 hours. Subsequently the mixture is filtered the alcohol is distilled off *in vacuo*, water is added to the residue and a precipitate thus obtained is filtered off. The liquid is neutralized with dilute hydrochloric acid. The phenylallylbarbituric acid precipitates from the liquid.

Our new substance crystallizes from water in the shape of white leaflets melting at 154–155° C. and dissolves in alcohol. It possesses the property of forming salts with many metals e. g. the alkali metals, or the calcium, the hydrogen of the NH group being replaced by the metal. It may be either used in the acid or salt form. The sodium salt is a white crystalline powder easily soluble in water.

We claim:—

As a new product phenylallylbarbituric acid of the formula:

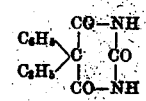

crystallizing from water in the shape of white leaflets melting at 154–155° C.; forming salts with alkali metals and calcium; and being a valuable hypnotic, substantially as described.

In testimony whereof we have hereunto set our hands in the presence of two subscribing witnesses.

HEINRICH HÖRLEIN. [L. S.]
WALTER KROPP. [L. S.]

Witnesses:
HELEN NUFER,
ALBERT NUFER.